United States Patent [19]

Gruner

[11] 4,008,656
[45] Feb. 22, 1977

[54] BREWING APPARATUS

[75] Inventor: Helmut J. Gruner, Brea, Calif.

[73] Assignee: Farmer Bros. Co., Torrance, Calif.

[22] Filed: Oct. 1, 1975

[21] Appl. No.: 618,712

[52] U.S. Cl. .................................. 99/298; 99/304
[51] Int. Cl.² ........................................ A47J 31/00
[58] Field of Search ............ 99/298, 279, 282, 284, 99/300, 304, 306; 210/294, 295

[56] References Cited
UNITED STATES PATENTS

| | | | |
|---|---|---|---|
| 3,385,201 | 5/1968 | Martin | 99/284 X |
| 3,412,672 | 11/1968 | Herbsthofer | 99/300 |
| 3,470,897 | 10/1969 | Karlen | 99/282 X |
| 3,844,206 | 10/1974 | Weber | 99/300 X |

Primary Examiner—Stanley N. Gilreath
Assistant Examiner—Arthur O. Henderson
Attorney, Agent, or Firm—Nilsson, Robbins, Dalgarn & Berliner

[57] ABSTRACT

A pour-over type coffee brewing apparatus is disclosed adapted for mounting under a cabinet or shelf and having a water receiver assembly containing means for immediately heating a charge of water and having a temperature-actuated valve for discharging the heated water at an appropriate temperature into a brewing vessel. A thermostatic device is included for automatically monitoring and controlling the activation of the heating means.

6 Claims, 8 Drawing Figures

U.S. Patent  Feb. 22, 1977  Sheet 1 of 2  4,008,656
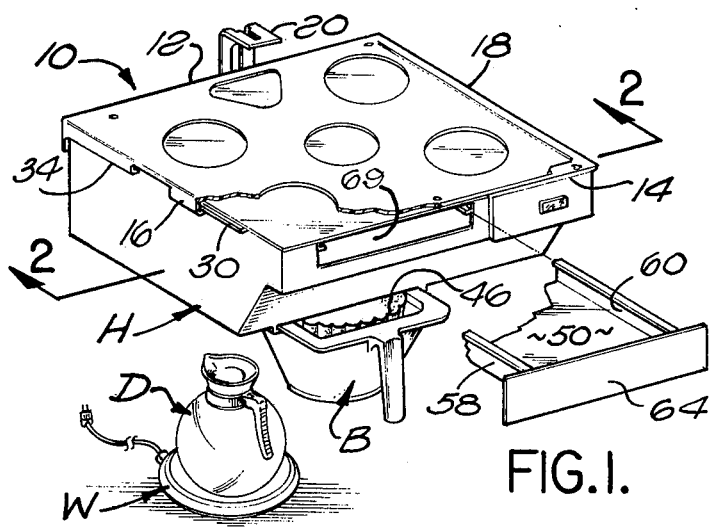
FIG.1.
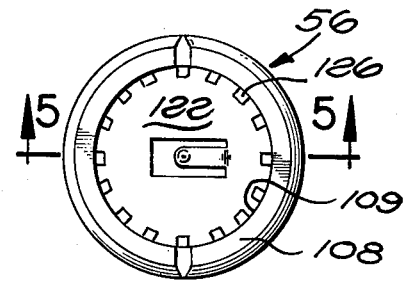
FIG.3.
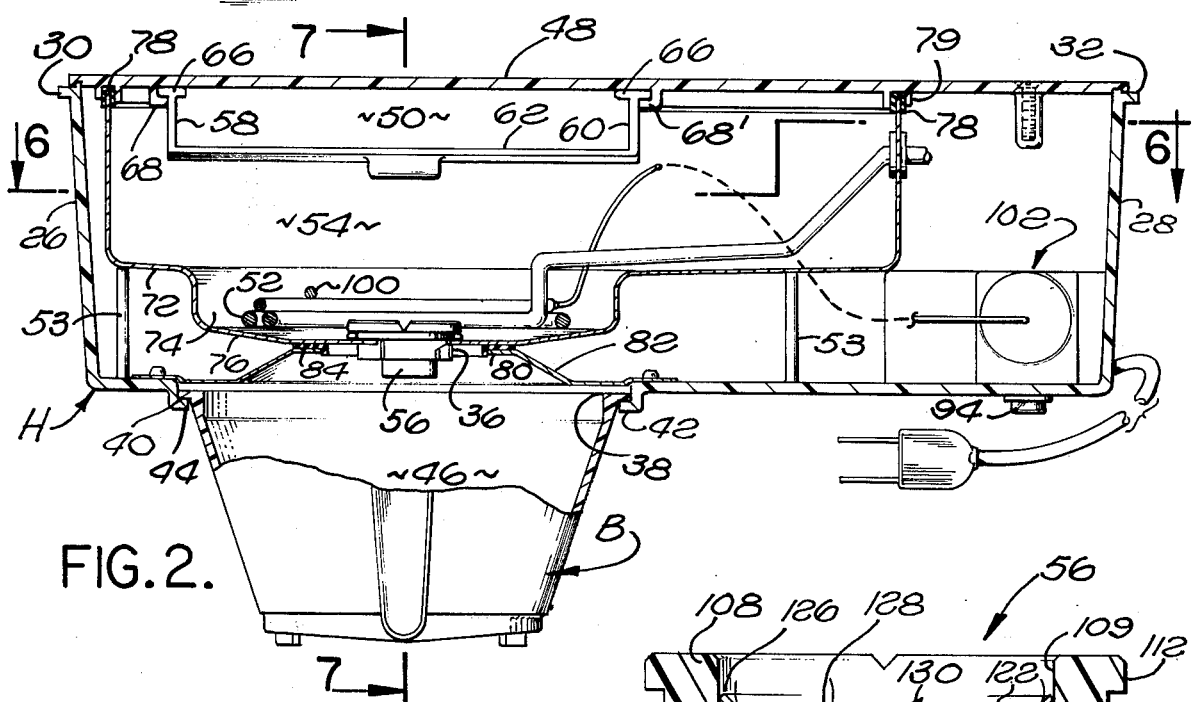
FIG.2.
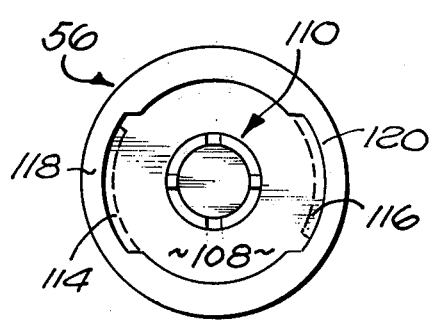
FIG.4.
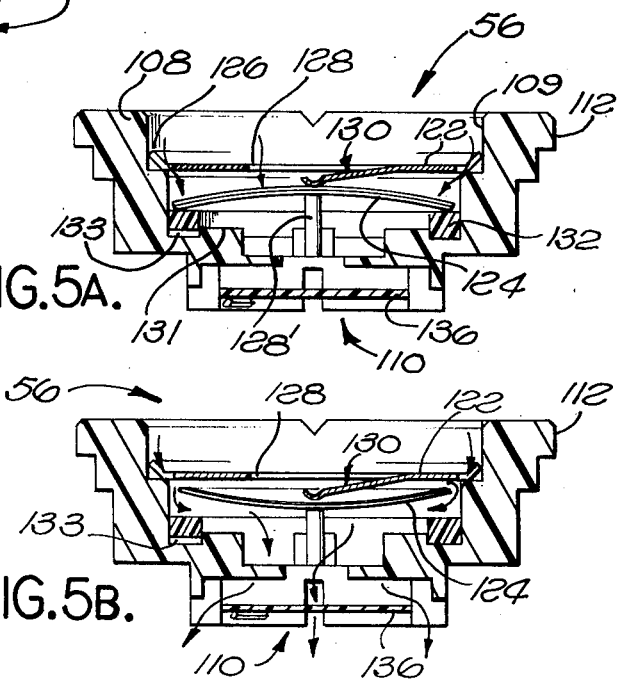
FIG.5A.
FIG.5B.

BREWING APPARATUS

BACKGROUND OF THE INVENTION

1. Field of the Invention

This invention relates to a coffee brewing apparatus, and more particularly to a pour-over type apparatus for brewing coffee by the disposable filter method, which apparatus is specifically adapted for mounting beneath a cabinet or shelf.

2. Description of the Prior Art

One type of coffee-brewing apparatus, representative of the prior art, is designed to have no permanent plumbing connections for its water supply and involves the manual pouring of a selected charge of cold water into the brewing apparatus to cause the discharge of a like amount of hot water. This device utilizes a water reservoir wherein the measured quantity of poured cold water displaces part of an existing pre-heated supply. This fresh charge of cold water will require some time to reach the proper brewing temperature. Thus, some delays in the brewing process will occur. This is particularly disadvantageous where consecutive pots of coffee are desired.

A method of brewing consecutive pots of coffee without relatively long delays is by directly heating the input water supply. For example, U.S. Pat. No. 3,347,149 discloses a brewing apparatus having a horizontal tank connected to a cold tap water supply by means of an inlet valve. By automatically controlling the valve, a predetermined amount of water is supplied to the tank for direct heating. Discharge occurs by means of a temperature activated switch. The cumbersome plumbing connections associated with this device are obviously its greatest disadvantage. These connections also add to the cost of fabricating the device as well as prohibit its installation in areas remote from standard water distribution systems.

Another type of apparatus as described in U.S. Pat. No. 3,693,535 also utilizes a direct heating method and, like the present invention, requires no displacement of a preheated supply. While this particular type also eliminates the need for a residual water reservoir, its fabrication and operation are overly complex. By means of a sophisticated flow valve, an amount of water passed to a heater unit from an inlet reservoir is controlled so as to obtain maximum heat transfer. A series of baffles, arranged in the heater unit also aid in the control of the water temperature prior to discharge. The amount of control that the heated water is subjected to during the heating process makes this apparatus unduly susceptible to maintenance problems. The sophisticated design of this apparatus will clearly involve substantial fabrication costs.

The present invention overcomes these disadvantages by providing a coffee-brewer which is simple, inexpensive and will provide fast yet efficient service. By employing a novel means for rapid heating and discharge of water into a brewing vessel, the problem of maintaining a charge of preheated water in a reservoir is eliminated. Furthermore, because of its simple design, the apparatus can be inexpensively produced and sold at a modest price. The device also lends itself to easy installation and use, not only in the home or office, but in areas remote from permanent plumbing connections, such as trailers, boats and campers.

SUMMARY OF THE INVENTION

Briefly, the present invention is a manual pour-over type coffee brewer wherein water flows by gravity from an inlet drawer to a receiver tray over an electrical heating element and thence by means of a novel temperature controlled valve through a coffee brewing vessel directly into a receptacle. The heating element is thermostatically controlled to provide for efficient brewing and to conserve electrical power. The thermostat switch may be easily reset for subsequent activation of the heating unit and rapid brewing of consecutive pots of coffee.

BRIEF DESCRIPTION OF THE DRAWINGS

A better understanding of the invention may be had from consideration of the following detailed description, taken in conjunction with the following drawings, in which:

FIG. 1 is a partially exploded perspective view of a coffee brewing apparatus constructed in accordance with the present invention;

FIG. 2 is a cross-sectional view of the brewing apparatus of FIG. 1 taken along the lines 2—2 of FIG. 1;

FIG. 3 is a top plan view of the discharge valve;

FIG. 4 is a bottom plan view of the discharge valve;

FIG. 5a is a sectional view of the discharge valve in the closed position taken along lines 5—5 of FIG. 3;

FIG. 5b is a sectional view of the discharge valve in the open position taken along lines 5—5 of FIG. 3;

DETAILED DESCRIPTION OF THE EMBODIMENT

Figure 6:
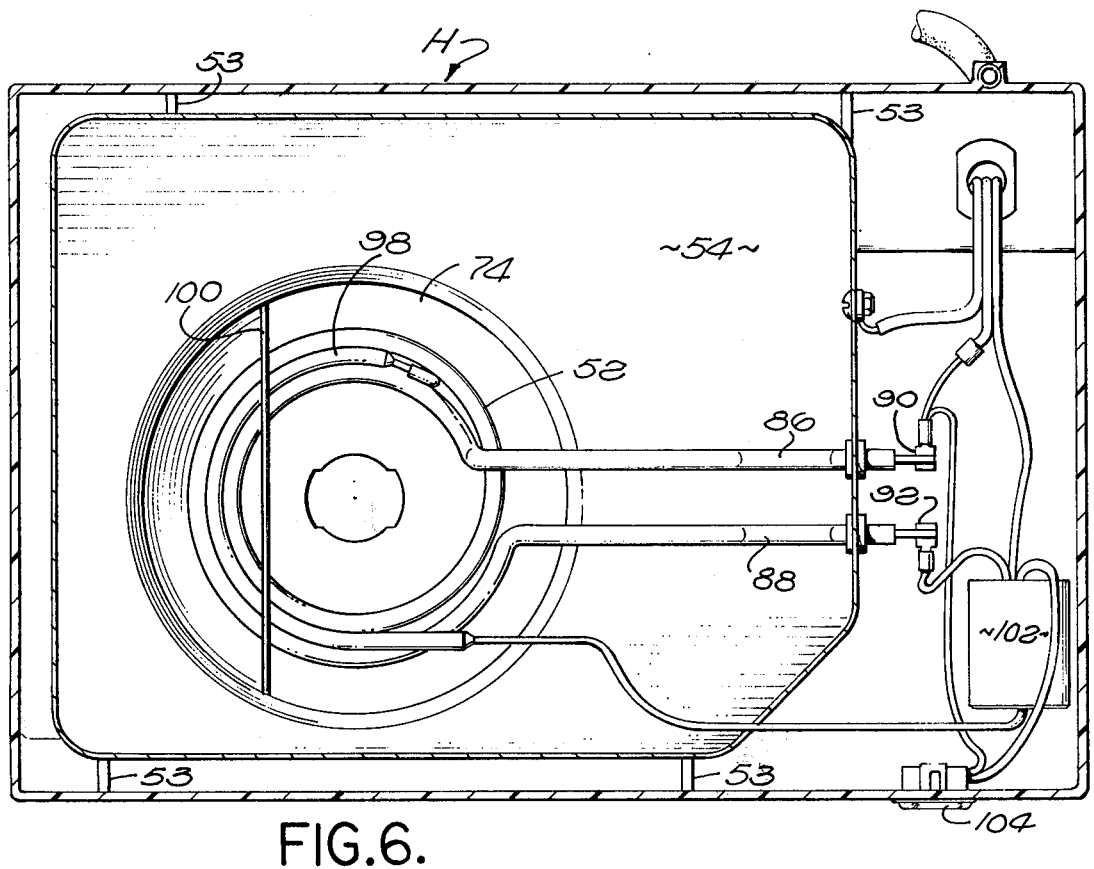
FIG. 6 is a cross-sectional view of the receiver assembly without the discharge valve taken on line 6—6 of FIG. 2.

Coffee brewing apparatus in accordance with the present invention includes an appropriate housing unit for mounting under a cabinet (as in a kitchen) or shelf (as in a office). The housing incorportes a receiver into which one may pour, through a drawer, a single container of water to be heated and immediately discharged. Discharge of the water is controlled by a temperature actuated discharge valve which opens only when the water reaches the desired temperature. Such a coffee brewing apparatus is illustrated in FIG. 1 and includes a housing H. Beneath the housing H, in alignment with a discharge orifice 36 (as shown in FIG. 2), is a brewing vessel B. The brewing vessel B contains a filter 46 on which a charge of coffee is placed as is well known in the art. As heated water is discharged through the orifice 36 and over the charge of coffee, brewed coffee is received in the decanter D positioned beneath the brewing vessel B. If desired, a hot plate or warmer W may be used to keep the contents of the decanter D warm. It will, of course, be recognized by those skilled in the art that the heated water may be discharged directly into the decanter D and then used to brew hot tea, make hot chocolate, soup or the like as may be desired.

The brewer is adapted for mounting in such a fashion as to free counter space normally occupied by such apparatus yet remains easily accessible for use. As is shown, particularly in FIG. 1, the housing H may be affixed to the bottom of a kitchen cabinet or the like by means of a mounting member 10. Referring to FIGS. 1 and 7, the mounting member 10 is a plate constructed of any desired material, but preferably composed of molded plastic and having a rear edge 12, a front edge 14, and sides 16 and 18. Along the front edge 14, a series of mounting holes are provided whereby screws or similar fasteners may secure this portion of the member 10 to the underside of a wood frame member of a kitchen cabinet C. At the rear edge 12 of the mounting member 10, one leg of an L-shaped bracket 20 having a longitudinal slot is adjustably secured by a wing-nut/-bolt combination 21 to a downwardly depending flange portion 22. The other leg of the L-shaped member 20, is secured to the underside of the kitchen cabinet C by fastener 24.

As shown in FIG. 2, the sides 26 and 28 of housing H are provided with runners 30 and 32. These runners are slidably received by downwardly depending inwardly turned complementary members 34 formed on sides 16 and 18 of the plate member 10. Thus, the entire housing may be securely suspended from the mounting member 10 under the kitchen cabinet C.

Referring now more specifically to FIG. 2, it may be seen that the housing H includes a removable lid 48 upon which there is mounted a water inlet drawer 50.

Figure 7:
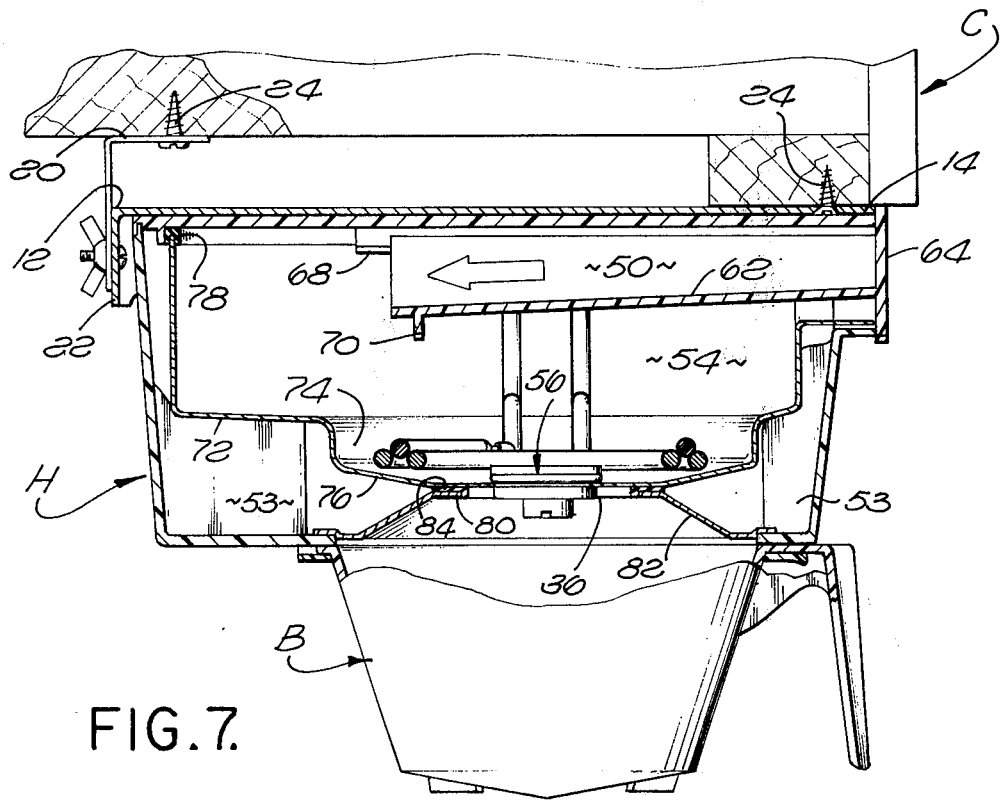
FIG. 7 is a cross-sectional view of the coffee brewing apparatus, taken along lines 7—7 of FIG. 2, in a mounted configuration.

The water inlet drawer 50 includes side walls 58, 60, bottom wall 62 and face 64. Side walls 58 and 60 include flanges 66 slidably received on complementary guide rails 68 – 68' of removable lid 48. The fully retracted or closed position of the drawer 50 is shown in FIG. 7. The drawer may be pulled outwardly through an opening 69 defined on the front side of the housing (shown in FIG. 1) to a stop position determined by the abutment of a protrusion 70 with the inner surface of receiver 54 adjacent the front wall of housing H. The bottom of the drawer 50 is sloped rearwardly and downwardly so that when a charge of water is poured into the drawer 50, it will, as shown by the direction of the arrow in FIG. 7 cascade into the water receiver assembly 54. Such sloping may be further insured by tilting the housing by adjustment of the plate member 10 through use of the wing-nut/bolt combination 21 and the slot in the arm 12 of the bracket 20.

Also included within the housing is a water receiver 54. The receiver 54 is preferably an aluminum tray having a base 72 which defines a recess or circular well 74. A base 76 of the well 74 slopes downwardly and inwardly from its circumference towards its center where there is mounted the discharge valve 56 which is disposed to close the orifice 36. The inner surface of the receiver may be coated with a material to prevent attack by alkaline water. For example, such coating may be a blend of Teflon and polyphenylenesulfide sold by the Whitford Chemical Company under the trademakr Xylan.

The entire water receiver assembly 54 is positioned in the housing H on four support ribs 53, as shown in FIGS. 6 and 7. A rubber gasket 78 is provided around the top of receiver 54 for sealing action with the channel 79 formed in the lid 48. The bottom surfaces of the well 74 of the receiver 54 rests on an annular boss 80 of condensation plate 82. Between the condensation plate 82 and the bottom surface of receiver 54 is high temperature silicon gasket 84 which is affixed around the receiver orifice 36.

Nesting in the well 74, as shown in FIG. 6, is a rigidly coiled resistive heating element 52 adapted for use with a standard 120 volt, 60 cycle household power source. Both ends of the heating element are connected to cold junction leads 86, 88 that have male spade terminals 90, 92 to which the electrical input connections are made. A push button switch 94 (FIG. 2), located beneath the housing H, activates the thermostat which controls the power to the heating element.

The sensor head 98 of a thermostat is rigidly positioned above the resistive heating element 52 and formed into a semicircular shape in rough alignment with the major circumference of the coiled resistive heating element. It is secured in this position by a clip element 100. The sensor head 98 activates a thermostat 102 which controls current to the resistive element 52. Shunted across the series connection made by the thermostat 102 and resistive heating element 52, is a pilot light 104 which indicates the presence of current flowing in the resistive element 52.

The water discharge valve 56, shown in FIG. 3, 4, 5a and 5b, includes a molded plastic member 108 having a circular opening 109 and spray head 110. A lip 112 is provided around the circumference of the circular opening 109. Beneath the lip 112 a pair of grooves 114, 116 (shown more clearly in FIG. 4) are provided on the plastic member 108 along with outwardly extending protrusions or ears 118 and 120, respectively. The shape of the circumference, at this point, complements the shape of the circumference of the opening defining the orifice 36 (FIG. 6). To secure the valve 56 in the orifice 36, the valve is merely inserted into orifice 36 until the lower surface of the lip 112 abuts the upper surface surrounding the orifice 36 and then rotated clockwise through 90° and locked into position much in the manner of the typical bayonet connection. Thus, its vertical movement is restrained by protrusions 118, 120 abuting one side of the surface surrounding the orifice 36 and the lip abutting on the other side.

The valve mechanism 56 includes a diaphragm 124. A disc 122, shown in elevation in FIG. 3, has a plurality of peripheral openings 126 and is disposed within circular opening 109. A tongue 130 depends from the disc 122 and is utilized to retain the diaphragm 124 in place upon a center post 128 and a sealing ring 132. The sealing ring 132 is rectangular in cross-section and includes a key (not shown) which extends between adjacent ribs such as shown at 131 to retain the ring 132 in position. The ring 132 defines a groove or recess 133 in the lower surface thereof to permit a predetermined amount of water leakage to occur. Such leakage is required to preclude a stagnant water condition about the diaphragm 124 interfering with proper operation thereof.

The diaphragm 124 is a bi-metallic structure which in its closed position is concaved downwardly as shown in FIG. 5a engaging the ring seal 132. Except for the controlled leakage, water flow from the receiver 54 into the brewing vessel B is precluded. When the water temperature about the diaphragm reaches the desired level; for example, 190° F, the diaphragm 124 snaps to the reverse position so that it is convex downwardly as viewed in FIG. 5b. As a result, heated water in the receiver 54 flows through the openings 126 and around the diaphragm 124 to flow through the spray head 110. A spray plate 136 located in the spray head 110 provides for an even distribution of the discharged water into the brewing vessel B.

The operation of the brewing apparatus is simple. When it is desired to brew a pot of coffee or obtain a pot of heated water, the user removes the brewing vessel from the apparatus and places therein a filter and, if desired, a measured quantity of ground coffee. The brewing vessel B is then installed under the housing A in alignment with discharge orifice 36.

The water inlet drawer 50 is then opened from its fully retracted position and a charge of cold water, equal to the quantity of coffee desired, is poured therein. The water flows from the drawer 50 into the receiver assembly 54.

The user, then depresses the push button switch 94 located beneath the housing H, closing the thermostat switch and thereby activating the power to the heating element. When the temperature of the water is raised to the predetermined brewing temperature, approximately 190° – 200° F, the temperature sensing head deactivates the thermostat switch shutting off power to the heating element 52. At approximately the same time, valve 56 activates, discharging the heated water into the brewing vessel.

The push button 94 may also be used to reset the thermostat. Thus, when the charge of water has been emptied from the apparatus and the user desires to make an additional pot of coffee immediately, he may load the brewing vessel B with another filter and quantity of coffee and immediately pour a new charge of water through the drawer 50, depress the push button 94 and the water immediately commences to heat.

What is claimed is:

1. A brewing apparatus comprising a housing means for installation under a shelf-like member;
    a normally empty water receiver assembly in said housing having electrical heating means disposed therein;
    means for manually introducing a predetermined amount of water into said water receiver assembly including a water inlet drawer slidably mounted on said housing and having a sloping bottom from which a charge of water is cascaded into said water receiver assembly;
    temperature-sensitive discharge valve means supported in said receiver assembly including a snap acting bi-metallic diaphragm to discharge water at a predetermined temperature; and
    a seal ring engaged by the periphery of said diaphragm when in the closed position, said seal ring defining a controlled leakage groove therein to permit a predetermined amount of water to pass prior to said water reaching that temperature at which said valve opens.

2. Brewing apparatus as defined in claim 1 which further includes mounting means having a plate-like member for attachment to said shelf-like member, adjusting means for tilting said housing means to insure water flow there into, and slide means for slidably receiving said housing.

3. Brewing apparatus as defined in claim 1 wherein said diaphragm is supported upon a centrally disposed post member.

4. Brewing apparatus as defined in claim 3 which further includes retaining means, said diaphragm means being positioned between said post member and said retaining means with the periphery of said diaphragm means unrestrained to permit movement thereof between a closed valve and open valve position.

5. The apparatus as set forth in claim 1 wherein said temperature-sensitive discharge valve means includes:
    a cylindrical member having a lower portion containing an orifice and means for sealably securing said cylindrical member to said receiver assembly;
    a retainer disc having a plurality of openings about the periphery thereof and located in a top portion of said cylindrical member;
    a central support post attached to said cylindrical member;
    an annular sealing ring mounted interiorly of said cylindrical member;
    a circular bi-metallic diaphragm positioned between said post and said retainer disc with the periphery thereof on said sealing ring in the absence of heated water and displaced from said sealing ring in the presence of water heated to a predetermined temperature;
    whereby said metallic diaphragm will be, for a normally closed position of said valve means, downwardly concave thereby depressing against sealing ring and preventing the water from discharging through the orifice, and upon flexion by the application of a predetermined amount of heat, will be convexed downwardly thereby discharging the water through the orifice.

6. The apparatus as set forth in claim 5 wherein said disc includes a tongue depending therefrom, said tongue engaging said diaphragm to hold it against said post.

* * * * *